United States Patent Office 2,953,593
Patented Sept. 20, 1960

2,953,593

PREPARATION OF NITRILES FROM HYDROGEN CYANIDE AND KETONES

William L. Fierce, Crystal Lake, and Walter J. Sandner, Carpentersville, Ill., assignors to The Pure Oil Company, Chicago, Ill., a corporation of Ohio No Drawing. Filed Sept. 30, 1957, Ser. No. 686,886

14 Claims. (Cl. 260—465)

This invention relates to new and useful improvements in methods for preparing organic nitriles and more particularly to a method of preparing aliphatic and aromatic nitriles by reaction of hydrogen cyanide and ketones at elevated temperatures.

In our copending application, Serial 658,976, filed May 14, 1957, now U.S. Patent 2,864,851, there is described our process for preparation of aliphatic and aromatic nitriles by reacting cyanogen and aliphatic or aromatic ketones at a temperature above the decomposition point of the ketone. When these ketones and cyanogen are reacted at elevated temperatures, there are produced good yields of the corresponding organic nitriles, and some unsaturated nitriles such as acrylonitrile. While the aforementioned process has been very effective, it is subject to the disadvantage that it uses cyanogen as one of the starting reactants. Cyanogen is often obtained by the partial oxidation of hydrogen cyanide and is more expensive and more difficult to obtain than is hydrogen cyanide. Hydrogen cyanide, however, is reported in the literature to react with ketones such as acetone at room temperature to form cyanohydrins, such as acetone cyanohydrin.

It is therefore one object of this invention to provide an improved method for preparing aliphatic and aromatic nitriles.

Another object of this invention is to provide a method for preparing a variety of aliphatic and aromatic nitriles from ketones and hydrogen cyanide.

A feature of this invention is provision of a process for preparing aliphatic and aromatic nitriles by high-temperature reaction of hydrogen cyanide and a ketone.

Another feature of this invention is the provision of a process for preparing aliphatic and aromatic nitriles, such as acetonitrile, propionitrile, acrylonitrile and benzonitrile, by the high-temperature reaction of hydrogen cyanide and lower alkyl or aryl ketones at a temperature above the decomposition point of the ketone.

Other objects and features of this invention will become apparent throughout the specification and claims as hereinafter related.

This invention comprises a process in which a dihydrocarbyl ketone and hydrogen cyanide are reacted at a temperature in the range from 600° to 1000° C. Within this range of temperature, aliphatic and aromatic ketones decompose readily to produce free radicals and carbon monoxide, with the free radicals reacting rapidly with the hydrogen cyanide to produce aliphatic and aromatic nitriles as the principal reaction products. The exact reaction mechanism is not known, although the reaction apparently proceeds by decomposition of the ketone with the free radicals reacting with the hydrogen cyanide to form the corresponding nitriles and producing carbon monoxide, hydrogen, and various other reaction by-products. The most probable equations for this reaction are:

(1) R'COR"+HCN→RCN+miscellaneous by-products or (2) R'COR"+2HCN→R'CN+R"CN+miscellaneous by-products where R' and R" are hydrocarbyl radicals from which the nitrile is derived and R is a hydrocarbyl radical.

With unsymmetrical ketones, the reaction products are mixed according to the free radicals liberated on decomposition of the ketone. The reaction of ketones and hydrogen cyanide proceeds well with any ketone which may be decomposed readily, but is easier to carry out using ketones which are sufficiently volatile to permit their being fed to the reaction zone in the gaseous state. The reaction proceeds well with any of the lower aliphatic, aromatic and mixed ketones as a reactant, e.g., acetone, methyl ethyl ketone, diethyl ketone, dipropyl ketone, dibutyl ketone, methyl propyl ketone, diamyl ketone, benzophenone, acetophenone, ethyl phenyl ketone, ethyl tolyl ketone, ditolyl ketone, 1-naphthyl ketone, dibenzyl ketone, and benzyl phenyl ketone.

This reaction proceeds well at atmospheric pressure, although it may be carried out either at subatmospheric or superatmospheric pressures. In carrying out this reaction the preferred mol ratio of ketone to hydrogen cyanide is in the range from 1:3 to 3:1. The lower ratios of ketone to hydrogen cyanide have been found to result in lower yields of nitriles per pass to the reaction zone. On the other hand, higher proportions of ketones produce higher yields per pass but result in losses to side reactions of the free radicals liberated on decomposition of the ketones. While the aforementioned range of proportions is somewhat preferred, the mol ratio of ketones and hydrogen cyanide may vary widely, as for example, from 1:20 to 20:1, and still produce organic nitriles as a principal reaction product. Reaction gases may be passed through the reaction zone at a gaseous hourly space velocity of approximately 50 to 2000, with a space velocity of 150 to 500 being preferred. In this process the term "space velocity" refers to the ratio of the volume of reactant gases, at standard temperature and pressure, charged per hour, to the volume of the reactant space. The reaction temperature may be from 600°–1100° C. and is preferably in the range from 650°–800° C.

The preferred method of carrying out this process is to mix the ketone to be reacted and hydrogen cyanide in the gaseous state and pass the mixture through a heated reaction zone. When relatively non-volatile (high boiling point) ketones are to be reacted, the ketones are fed as liquids directly to the reactor and vaporized directly into the reaction zone. Any type of reaction zone may be used which is resistant to attack by the reactants or reaction products. Quartz, high-silica, glass, stainless steel, or other refractory and corrosion-resistant materials may be used. The reaction zone may be heated by any suitable means, such as combustion gases applied externally to the reactor, external or internal electrical heaters, including resistance heaters and induction heaters, heating tubes extending through the reactor, or hot refractory pebbles intermittently or continuously heated and supplied to the reactor.

The product gases from the reaction zone consist of a mixture of aliphatic and/or aromatic nitriles, unreacted hydrogen cyanide, ketones, carbon monoxide, hydrogen, and other ketone decomposition products. These reaction gases are withdrawn from the reaction zone and cooled to a temperature sufficiently low to condense the nitriles and condensible by-products, so that the unreacted hydrogen cyanide and ketones may be recycled to the reaction zone. The liquid which is condensed from the reaction gases will ordinarily have to be fractionated to obtain pure nitriles, and may require fractionation for efficient recycle of the hydrogen cyanide and reactant ketones.

A number of experiments were carried out in which hydrogen cyanide and acetone were reacted at elevated temperatures under a variety of conditions. In these experiments helium was bubbled through liquid acetone at room temperature, and the resulting stream of helium plus acetone vapor was then blended with hydrogen cyanide and passed through an empty, electrically heated tube of Vycor high-silica glass. The gas mixture charged to the reactor tube and the product gases were analyzed by a mass spectrometer to determine the composition of the charge gas and the product gases. The experimental conditions and results are set forth in Table I.

*Table I*

| Run No. | 95 | 96 |
| --- | --- | --- |
| Temperature (° C.) | 588 | 693 |
| Mole Ratio of $CH_3COCH_3/HCN$ | 1.83 | 2.17 |
| Gaseous hourly space velocity of charge gas | 306 | 318 |
| Percent Conversion of HCN | 2.6 | 14.1 |
| Percent Conversion of $CH_3COCH_3$ | 4.4 | 38.5 |
| Acetonitrile—Yield per pass based on HCN | 0.0 | 7.9 |
| Acetonitrile—Yield per pass based on $CH_3COCH_3$ | 0.0 | 3.7 |
| Acetonitrile—Selectivity: | | |
| Based on HCN | 0.0 | 56.2 |
| Based on Acetone | 0.0 | 9.5 |

The yield per pass is defined as the mols of the indicated product formed, expressed as percent of the mols of HCN or acetone charged. Selectivity is a similar percentage based upon the mols of HCN or acetone consumed.

From these and other experiments it has been found that there is no formation of nitriles at temperatures below about 600° C. Above 600° C. there are various aliphatic nitriles formed according to the temperature and mol ratio of the reactants. When hydrogen cyanide is present in excess, the only nitrile formed in any appreciable amount is acetonitrile. However, when acetone is present in excess, small amounts of propionitrile and acrylonitrile may form at higher reaction temperatures. In these experimental runs no catalyst was used, but it is expected that suitable catalysts would accelerate the rate of reaction to permit the reaction to proceed at slightly lower temperatures.

In another experiment, diethyl ketone was reacted with hydrogen cyanide at 659° C. in the same apparatus using the same procedure as the previous runs. The mol ratio of diethyl ketone to hydrogen cyanide was 2.16 and the charge gases were passed through the reaction zone at a gaseous hourly space velocity of 369. In this experiment there was a 25.4% conversion of hydrogen cyanide. The major products of this reaction are acetonitrile, in about 3.0% yield and 11.7% selectivity, propionitrile, 1.8% yield and 7.0% selectivity, and acrylonitrile, 0.6% yield and 2.3% selectivity. No other nitriles were formed and the other products were decomposition products of the ketone.

This process is operative with other aliphatic and aromatic ketones, although aliphatic ketones which are higher than diethyl ketone tend to produce a mixture of nitriles in rather low yield. When the ketone used has an appreciable vapor pressure at room temperature, it may be vaporized in the same manner as acetone and diethyl ketone into a stream of helium. Higher boiling aliphatic and aromatic ketones are metered as liquids directly to the reaction zone. The reaction of a mixed aliphatic ketone, methyl ethyl ketone, with hydrogen cyanide at temperatures at the range of 650° to 800° C. produces a mixture of acetonitrile, propionitrile and acrylonitrile.

In the preparation of aromatic nitriles, according to this invention, it is possible to prepare benzonitrile by high-temperature reaction of acetophenone or benzophenone and hydrogen cyanide at a temperature above the decomposition point of the ketone. In carrying out this reaction, a flow apparatus substantially the same as that used in the other experiments is used for mixing and reacting the ketone and hydrogen cyanide. Benzophenone (M.P. 26°–50° C.) is melted and metered to the reaction tube using a heated, peristaltic pump and heated flow lines to prevent solidification. The hydrogen cyanide is fed to the reaction tube through a separate line. The benzophenone vaporizes into the reaction zone, which is heated to 700° to 900° C., where the benzophenone decomposes and reacts with the hydrogen cyanide. The gaseous reaction products are withdrawn from the reaction tube and condensed, using an air-cooled condenser. Gaseous products passing through the condenser are analyzed by a mass spectrometer. Products which are condensed are dissolved in carbon tetrachloride and analyzed using an infrared spectrophotometer. At a gaseous hourly space velocity of 150 to 300 there is no appreciable formation of nitriles at 600° C. after two hours reaction time. At about 700° C. there is an appreciable conversion of benzophenone to benzonitrile, and at temperatures of about 800° C. the conversion of benzophenone is substantial and a substantial yield of benzonitrile is obtained.

The reaction of acetophenone and hydrogen cyanide is carried out in the same apparatus and using the same procedure as the corresponding reaction with benzophenone. As in the case of other mixed ketones, the reaction products are those produced by the reaction of hydrogen cyanide with the free radicals and with other decomposition products. At 550° to 600° C. there is an appreciable decomposition of acetophenone with the production of small amounts of acetonitrile. At 750° to 850° C. the conversion of acetophenone is higher and at this temperature there are produced higher yields of acetonitrile together with benzonitrile and other nitriles formed from the decomposition products of the acetophenone.

From our experiments we have found that nitriles are formed, when ketones, either symmetrical or unsymmetrical, aliphatic, aromatic, or mixed, are heated to a temperature above their decomposition point, in the range of 600° to 1100° C., in the presence of hydrogen cyanide. The yield and character of the reaction product vary somewhat with the temperature of the reaction and may require some experimentation to determine the optimum conditions for producing a given product from a given ketone. Thus the optimum conditions for production of acetonitrile from acetone and hydrogen cyanide are somewhat different from the optimum conditions for preparation of benzonitrile from benzophenone and hydrogen cyanide. It has also been found that hydrogen cyanide does not react thermally with equal efficiency with all ketones to form nitriles. The reaction with acetone gives good yields of nitriles. However, with diethyl ketone the reaction is less specific (a mixture of products are obtained) and the yields of nitriles are rather low. Other aliphatic ketones produce nitriles in low yield which are in a mixture of nitriles produced by reaction of the free radicals, produced on decomposition of the ketone, with hydrogen cyanide, and nitriles produced by reaction of decomposition products of the free radicals with hydrogen cyanide. With aromatic ketones and mixed aliphatic-aromatic ketones, the aromatic nitriles are produced in higher yield due to the greater stability of the aromatic nucleus.

Having thus described our invention, as required by the patent laws, we wish to have it understood that within the scope of the appended claims this invenion may be practiced otherwise than as specifically described.

What is claimed is:

1. The method of preparing organic nitriles of the formula RCN, where R is a hydrocarbyl radical, which comprises reacting hydrogen cyanide and a ketone of the formula R'COR", where R' and R" are hydrocarbyl radicals from which the nitrile is derived, at a temperature above the thermal decomposition point of the ketone in the range from about 600° to 1100° C.

2. A method according to claim 1 in which the ketone is a symmetrical ketone.

3. A method according to claim 1 in which the ketone is an unsymmetrical ketone.

4. A method according to claim 1 in which the ketone is an aliphatic ketone.

5. A method according to claim 1 in which the ketone is an aromatic ketone.

6. A method according to claim 1 in which the ketone is a mixed aromatic-aliphatic ketone.

7. A method according to claim 1 in which the mol ratio of ketone to hydrogen cyanide is in the range from 1:20 to 20:1.

8. A method according to claim 7 in which the hourly space velocity of charge gases is from 50 to 2000.

9. A method of preparing lower aliphatic nitriles which comprises reacting hydrogen cyanide with acetone at a temperature above the thermal decomposition point of the acetone in the range from about 600° to 1100° C.

10. A method according to claim 9 in which the reaction temperature is 650°–800° C., the mol ratio of acetone to hydrogen cyanide is in the range of 1:3 to 3:1, the hourly space velocity of charge gases is 150 to 500, and the principal reaction product is acetonitrile.

11. A method of preparing lower aliphatic nitriles which comprises reacting hydrogen cyanide with diethyl ketone at a temperature above the thermal decomposition point of the ketone in the range from about 600° to 1100° C.

12. A method according to claim 11 in which the reaction temperature is 650° to 800° C., the mol ratio of diethyl ketone to hydrogen cyanide is in the range of 1:3 to 3:1, the hourly space velocity of charge gases is 150–500, and the principal reaction products are acetonitrile, acrylonitrile, and propionitrile.

13. A method of preparing aliphatic and aromatic nitriles which comprises reacting hydrogen cyanide with acetophenone at a temperature above the thermal decomposition point of the ketone in the range from about 600° to 1100° C.

14. A method of preparing benzonitrile which comprises reacting hydrogen cyanide with benzophenone at a temperature above the thermal decomposition point of the ketone in the range from about 600° to 1100° C.

References Cited in the file of this patent

UNITED STATES PATENTS

| | | |
|---|---|---|
| 2,166,600 | Leupold | July 18, 1939 |
| 2,188,340 | Dykstra | Jan. 30, 1940 |

OTHER REFERENCES

Wagner and Zook: "Synthetic Organic Chemistry," 1953, page 604.